(12) United States Patent
Bierhoff

(10) Patent No.: US 6,802,072 B2
(45) Date of Patent: Oct. 5, 2004

(54) TURNTABLE FOR A DISC-SHAPED INFORMATION CARRIER, AND PLAYER WITH SUCH A TURNTABLE

(75) Inventor: Waltherus Cornelis Jozef Bierhoff, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 173 days.

(21) Appl. No.: 10/131,769

(22) Filed: Apr. 24, 2002

(65) Prior Publication Data

US 2002/0159381 A1 Oct. 31, 2002

(30) Foreign Application Priority Data

Apr. 26, 2001 (EP) .............................................. 01201527

(51) Int. Cl.$^7$ ............................................ G11B 17/028
(52) U.S. Cl. ..................................... 720/696; 369/264
(58) Field of Search ............................... 369/264–271; 720/696, 697, 700

(56) References Cited

U.S. PATENT DOCUMENTS 4,176,847 A * 12/1979 Akai et al. ................... 369/266
5,193,084 A * 3/1993 Christiaens .................. 369/258

FOREIGN PATENT DOCUMENTS

EP 555486 A1 * 8/1993 ............ G11B/23/00
EP 1094462 A1 * 4/2001 ............ G11B/19/20
JP 58153283 A * 9/1983 ............ G11B/25/04

* cited by examiner

*Primary Examiner*—William Klimowicz
(74) *Attorney, Agent, or Firm*—Michael E. Belk

(57) ABSTRACT

The invention relates to a turntable (1) for a disc-shaped information carrier. The turntable is provided with a central element (2), which has a central shaft opening (8), a support surface (6) for the information carrier extending perpendicularly to a central axis of the shaft opening, and a driving member (3) having an output shaft (12) for rotationally driving the central element and the support surface. The output shaft and the shaft opening together form a clamping connection, and the output shaft extends in the shaft opening over an insertion length (1).

Figure 1:
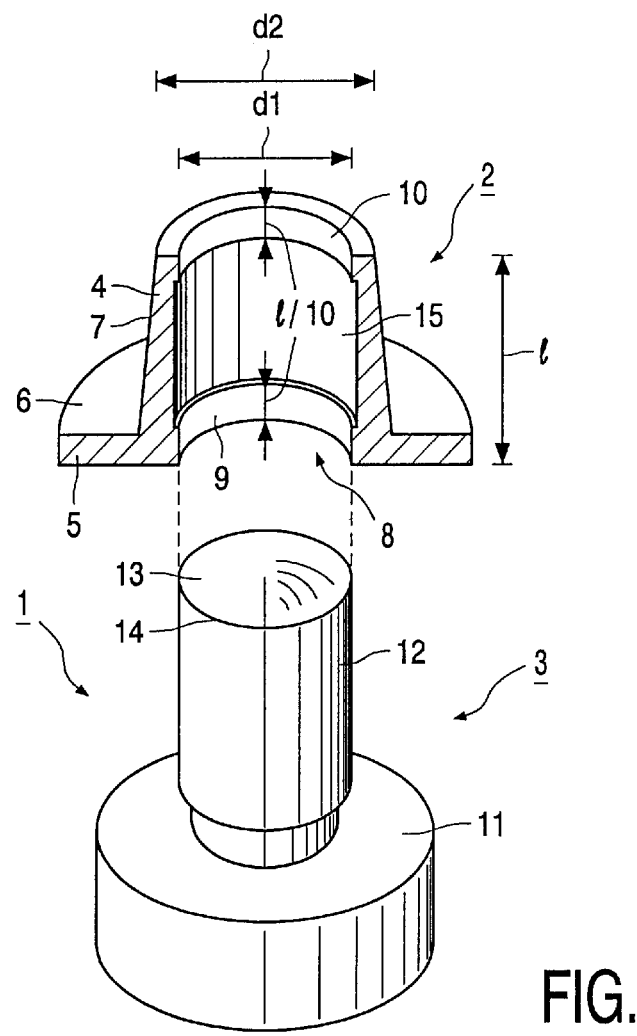

According to the invention, the output shaft (12) is in clamping contact with the shaft opening (8) exclusively via a contact portion of the output shaft having a contact length which is smaller than the insertion length. Preferably, the contact portion exclusively comprises a first part (22) and a second part (23) respectively situated near both end portions of the shaft opening.

The clamping connection according to the invention results in an improved perpendicularity between the output shaft (12) and the support surface (6).

The turntable (1) according to the invention is suitable for use in a player according to the invention for disc-shaped information carriers.

17 Claims, 2 Drawing Sheets

TURNTABLE FOR A DISC-SHAPED INFORMATION CARRIER, AND PLAYER WITH SUCH A TURNTABLE

The invention relates to a turntable for a disc-shaped information carrier, which turntable is provided with a central element which has a central shaft opening, a support surface for the information carrier extending perpendicularly to a central axis of the shaft opening, and a driving member having an output shaft for rotationally driving the central element and the support surface, which shaft forms a clamping connection with the shaft opening wherein the shaft extends over an insertion length.

The invention also relates to a player for disc-shaped information carriers, which player is provided with a turntable, which turntable is provided with a central element which has a shaft opening, a support surface for the information carrier extending perpendicularly to a central axis of the shaft opening, and a driving member having an output shaft for rotationally driving the central element and the support surface, which shaft forms a clamping connection with the shaft opening wherein the shaft extends over an insertion length.

A turntable and a player of the types mentioned in the opening paragraphs are generally known and generally used, for example in CD players and DVD players. In order to bring about the clamping connection between the shaft and the shaft opening the shaft is pressed into the shaft opening. This causes the problem that due to an almost unavoidable slight misalignment between the central axes of the shaft opening and the shaft when it is pressed, asymmetrical accumulation of material occurs, as a result of which the cylindrical shaft opening is to some extent asymmetrically deformed. This is at the expense of the perpendicularity between the support surface and the output shaft, which in particular at relatively high speeds of rotation, such as for example 200 revolutions per second in a DVD player, can lead to instabilities and oscillation effects, even if said lack of perpendicularity occurs only to a very limited extent. Moreover, state-of-the-art optical players are using laser light with increasingly shorter wavelengths. This also imposes more stringent requirements on the permissible axial excursion of the information carrier during rotation, because of the tolerances concerning the focal distance. In order to achieve the required perpendicularity between the support surface and the output shaft, the central element with the output shaft clamped in the shaft opening is subjected to a machining operation, which is a very costly matter.

An aim of the invention is to provide a turntable and a player of the type mentioned in the opening paragraphs, wherein the abovementioned disadvantage of the known turntable and the known player is overcome as far as possible, and wherein during mass-production a relatively high accuracy in the assembled state in terms of the perpendicularity between the output shaft and the support surface is achieved.

In order to achieve this aim, a turntable in accordance with the invention is characterized in that only a contact portion of the output shaft having a contact length which is smaller than the insertion length is in clamping contact with the shaft opening.

In order to achieve this aim, a player in accordance with the invention is characterized in that the turntable used therein is a turntable in accordance with the invention.

The invention is based on the recognition that it is not necessary to bring the output shaft and the shaft opening into clamping contact with each other over the entire insertion length to achieve a good power transmission between the output shaft and the central element with the support surface coupled thereto. By limiting the contact between the output shaft and the shaft opening to a contact length that is smaller than the insertion length, the amount of deformation that occurs on the surface of the shaft opening or of the output shaft is considerably reduced. There is also space and opportunity for any accumulating of material to "settle" within the insertion length but outside of the contact length. All this has the favorable result that the permissible tolerances as regards the diameters of the shaft opening and the output shaft can increase by a few tens of micrometers. Naturally this lowers costs, inter alia, because it is possible to manufacture the central element and the driving member from materials that are themselves cheaper and are cheaper to process.

A very advantageous turntable is obtained if the contact portion comprises at least a first part and a second part and more preferably exclusively a first part and a second part respectively situated near both end portions of the shaft opening. It has been found that such a contact portion can provide sufficient stability at the clamping connection between the output shaft and the central element, and leads to optimum perpendicularity between the output shaft and the support surface.

It has also been found to be advantageous if the contact length is less than 6 mm, or more preferably less than 4 mm of the insertion length. In this manner, in the case of current shaft diameters for turntables, that are between 1 mm and 10 mm, the friction and displacement forces between the output shaft and the shaft opening during pressing the shaft into the central opening, which forces could lead to the deformations described, remain limited.

The creation of the smaller contact length in relation to the insertion length can take place in accordance with a preferred embodiment form in that the output shaft has a diameter, over a portion of the insertion length that does not coincide with the contact portion, that is smaller than a diameter of the shaft at the location of the contact portion. Alternatively, it is also possible that the diameter of the shaft opening, over a portion of the insertion length that does not coincide with the contact portion is greater than a diameter of the shaft opening at the location of the contact portion. Such a configuration offers production-technical advantages because for the production of the central element using an injection molding process only a limited, once-only adaptation of the mould for the central element is required. The output shaft will in general be manufactured from a metal, as a result of which the provision of a portion with a smaller diameter will require an additional machining operation. Naturally a combination is also possible wherein both the output shaft, over a portion of the insertion length that does not coincide with the contact portion, has a diameter that is smaller that the diameter of the shaft at the location of the contact portion, and the shaft opening, over a portion of the insertion length that does not coincide with the contact portion, has a diameter that is greater than the diameter of the shaft opening at the location of the contact portion. By reducing the diameter of the shaft or increasing the diameter of the shaft opening a space is created in a practical manner between the shaft opening and the shaft. In the area of this space there will be no frictional forces between the shaft and the shaft opening, and space is provided for deformations of material.

According to a very advantageous preferred embodiment an adhesive is provided over a portion of the insertion length, that does not coincide with the contact portion, between the shaft and the shaft opening. With such an adhesive a glued joint is created supplementary to the clamping contact between the shaft opening and the shaft. Such a glued joint is particularly useful if in the course of time relaxation of the clamping contact between the shaft and the shaft opening occurs. Such a relaxation occurs in particular if the central element is manufactured by means of an injection molding process from synthetic material.

Figure 2:
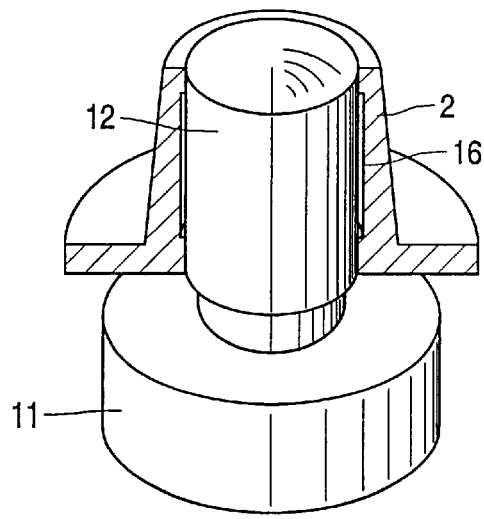
Figure 3:
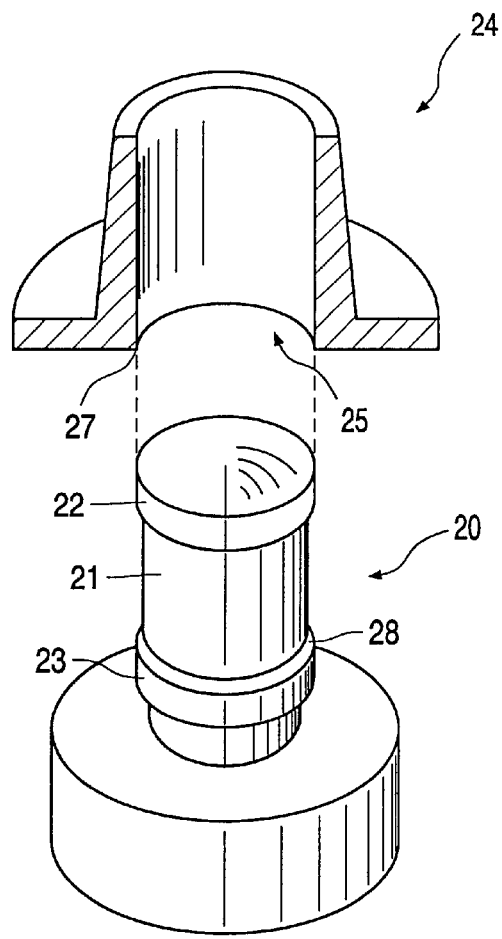
Figure 4:
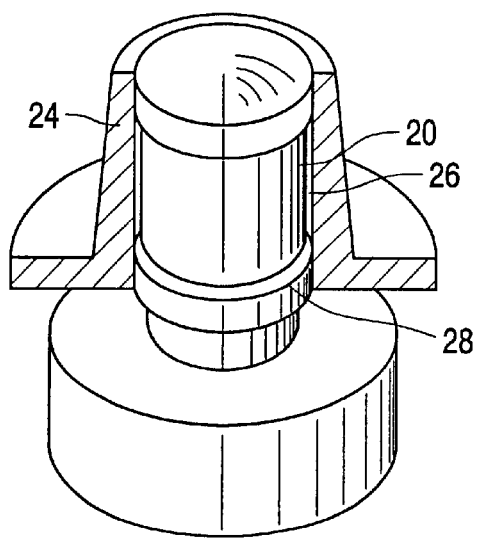

The invention is explained in more detail hereinbelow using a description of two preferred embodiments of the invention, for which reference is made to respectively FIGS. 1 and 2 and FIGS. 3 and 4, in which FIG. 1 diagrammatically shows a first preferred embodiment of a turntable in accordance with the invention in the unclamped state;

FIG. 2 shows the turntable in accordance with FIG. 1 in the clamped state;

FIG. 3 diagrammatically shows a second preferred embodiment of a turntable in accordance with the invention in the unclamped state, and FIG. 4 shows the turntable in accordance with FIG. 3 in the clamped state.

FIG. 1 diagrammatically shows a first preferred embodiment of a turntable 1 in accordance with the invention, in the unclamped state. Turntable 1 comprises a central element 2, which in the example shown is designed as a centering element and a drive unit 3. Central element 2 comprises a mainly tubular portion 4 having collar-like portion 5 on the side facing towards the drive unit 3. A top side of the collar-like portion 5 forms a circular support surface 6 for a disc-shaped information carrier. An outside 7 of the tubular portion 4 a slightly tapers upward, as a result of which a centering effect is achieved when a disc-shaped information carrier with a central opening is placed from above on the support surface 6. Within the tubular portion 4 there is a shaft opening 8 with a length 1. Within the length the shaft opening 8 has edges 9, 10 at both ends, each edge having a length in the axial direction of $\frac{1}{10}$ and a diameter of $d_1$. Between the edges 9 and 10 an intermediate portion 15 is present, logically with a length of 0.81, and with a diameter of $d_2$, wherein $d_2$ is greater than $d_1$. The difference between $d_1$ and $d_2$ in the example shown is approximately 40 micrometers.

Drive unit 3 comprises mainly an electric motor 11 for driving output shaft 12. The diameter of the output shaft 12 is large enough co create a clamping connection between shaft 12 and shaft opening 8 at the location of the edges 9 and 10. Shaft 12 has a spherical head 13. In order to connect the output shaft 12 with the central element 2, the central element 2 is pressed onto the output shaft 12 so that the situation as shown in FIG. 2 results. If during pressing, the output shaft 12 and the central element 2 are not positioned completely coaxially but are slightly misaligned, which is often the case, then a small degree of correction of this misalignment is still possible in that once top edge 14 of output shaft 12 has passed edge 9 but not yet edge 10, there is space, on account of the larger diameter $d_2$, to make a slight correctional tilting movement as soon as the top edge 14 comes into contact with edge 10 of centering element 2, with a self-locating effect occurring in particular at the location of the top edge 14 thanks to the spherical form of the head 13. Deformations that occur unexpectedly in edge 9 as a result of possible misalignment can be dealt with in the circular chamber 16 that results in the assembled state between central element 2 and output shaft 12.

In the second preferred embodiment as shown in FIGS. 3 and 4, the limited contact length is created in another way, namely by providing output shaft 20 with a central portion 21 that has a diameter that, in the example shown, is 40 micrometers smaller than the diameter of both end portions 22, 23 of output shaft 20. Central element 24 has a shaft opening 25 with a constant diameter such that shaft opening 25 is a force fit on the ends 22 and 23. Also in this configuration, a circular chamber 26 results in the assembled state (see FIG. 4), between central element 24 and output shaft 20. In the second embodiment, like in the first embodiment, it is possible to correct any initial slight misalignment of the output shaft 20 in relation to the shaft opening 25 of central element 24, resulting from the passage of end 22 along the bottom edge 27 of central element 24. To this end the transition 28 between central portion 21 and end 23 is smooth in order to create a self-locating effect when end 23 passes along bottom edge 27 of central element 24.

In order to strengthen the connection between shaft and central element, it is possible to apply an adhesive, preferably of the anaerobic type, in the spaces 16, 26 between shaft and central element, in order to compensate for a reducing clamping force between shaft and central element in the course of time as a result of relaxation of synthetic material.

Both examples described above of a turntable in accordance with the invention are suitable for application in a player in accordance with the invention for the playing, that is reading and/or writing, disc-shaped information carriers such as CDs or DVDs. For the sake of simplicity, the player is not shown in more detail in the Figures, and apart from the turntable, its construction is known per se and usual, with the electric motor 11 being secured to a main frame of the player. In the examples shown, the player further comprises an optical scanning device with an optical scanning unit that can be displaced, by means of a linear displacement unit, along the information carrier present on the support surface 6 in a mainly radial direction with respect to the shafts 12, 20. The invention also comprises players that are provided with other types of scanning devices, such as magnetic or magneto-optical devices. Such players are suitable for playing magnetic or magneto-optical information carriers, respectively.

What is claimed is:

1. Turntable for a disc-shaped information carrier, which turntable comprises a central element with a shaft opening, a support surface for the information carrier extending perpendicularly to the central axis of the shaft opening, and a driving member having an output shaft for rotationally driving the central element and the support surface, which shaft forms a clamping connection with the shaft opening wherein the shaft extends over an insertion length, wherein the shaft and the shaft opening have a contact length that is smaller than the insertion length, and the shaft is in clamping contact with the shaft opening wherein the contact length is discontinuous.

2. Turntable as claimed in claim 1, characterized in that the contact portion comprises at least a first part and a second part respectively situated near both ends of the shaft opening.

3. Turntable as claimed in claim 2, characterized in that the contact portion comprises exclusively a first part and a second part respectively situated near both ends of the shaft opening.

4. The turntable of claim 3, wherein the first and second parts are separated by a non-contact portion, which non-contact portion comprises a non-contact length of the shaft surrounded by a non-contact section of the shaft opening.

5. The turntable of claim 4, wherein the first and second parts are rings of contact between the shaft and shaft opening, while the non-contact portion is a non-contact cylinder between the rings.

6. The turntable of claim 5, wherein the contact rings are realized by ring shaped protrusions on the shaft opening, which protrusions project inwardly.

7. The turntable of claim 5, wherein the contact rings are realized by ring shaped protrusions on the shaft, which protrusions project outwardly.

8. Turntable as claimed in claim 1, characterized in that the contact length is less than 6 mm.

9. Turntable as claimed in claim 8, characterized in that the contact length is less than 4 mm.

10. Turntable as claimed in claim 1, characterized in that the output shaft has a diameter, over a portion of the insertion length that does not coincide with the contact portion, that is smaller than a diameter of the shaft at the location of the contact portion.

11. Turntable as claimed in claim 1, characterized in that the shaft opening has a diameter, over a portion of the insertion length that does not coincide with the contact portion, that is greater than a diameter of the shaft opening at the location of the contact portion.

12. Turntable as claimed in claim 1, characterized in that, over a portion of the insertion length that does not coincide with the contact portion, an adhesive is applied between the shaft and the shaft opening.

13. Player for disc-shaped information carriers, which player is provided with a turntable, which turntable is provided with a central element which has a shaft opening, a support surface for the information carrier extending perpendicularly to a central axis of the shaft opening, and a driving member having an output shaft for rotationally driving the central element and the support surface, which shaft and shaft opening together form a clamping connection, and the shaft extends in the shaft opening over an insertion length, characterized in that the turntable is a turntable as claimed in claim 1.

14. The turntable of claim 1, wherein the contact length is small compared with the insertion length.

15. A method for fixing a shaft to a turntable, the method comprising:

first pushing the shaft into a shaft opening of the turntable, which turntable is for bearing an information carrier, wherein the shaft and shaft opening are configured to achieve a contact length that is less than an insertion length of the shaft into the shaft opening, which first pushing achieves contact with the shaft opening along a first portion of the contact length; allowing a correctional tilting between the shaft and the turntable to improve positioning of the turntable; and second pushing the shaft to achieve clamping contact with the shaft opening along a second portion of the contact length.

16. The method of claim 15, wherein the shaft has a top that is at least partly rounded and that facilitates said first pushing and said correctional tilting motion, when the shaft is not fully aligned with the shaft opening.

17. The method of claim 15, wherein the first and second portions are discontinuous, and wherein a discontinuity between the first and second portions facilitates said correctional tilting motion.

* * * * *